Figure 1:
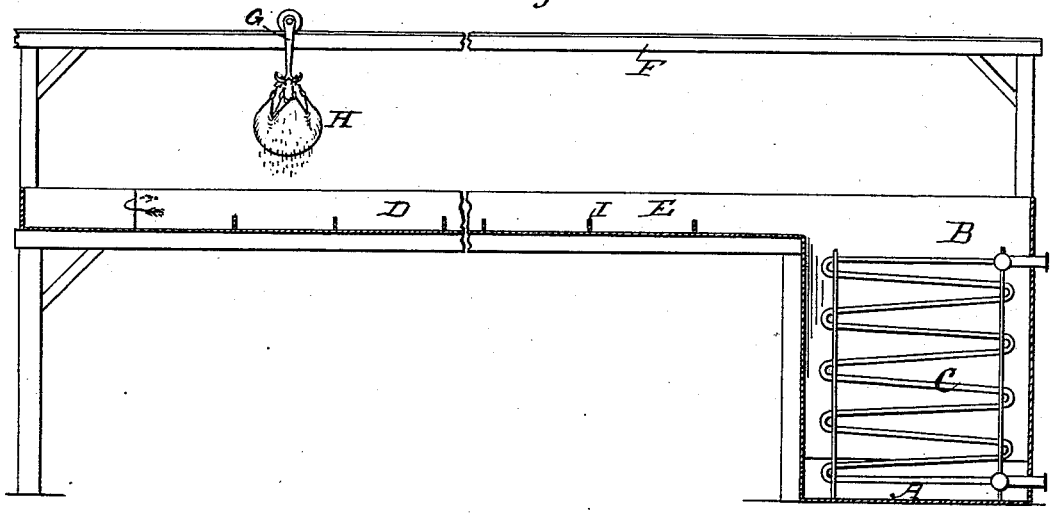

(No Model.)

H. FRASCH.
GRAINING OR CRYSTALLIZING SALT, &c., AND APPARATUS THEREFOR.

No. 277,418. Patented May 8, 1883.

Witnesses:
E. E. Masson
Phil'p Mauro

Inventor:
Herman Frasch
by Chas. J. Hedrick
his attorney

UNITED STATES PATENT OFFICE.

HERMAN FRASCH, OF CLEVELAND, OHIO, ASSIGNOR TO THE AMERICAN CHEMICAL COMPANY, OF WEST BAY CITY, MICHIGAN.

GRAINING OR CRYSTALLIZING SALT, &c., AND APPARATUS THEREFOR.

SPECIFICATION forming part of Letters Patent No. 277,418, dated May 8, 1883.

Application filed August 29, 1882. (No model.)

*To all whom it may concern:*

Be it known that I, HERMAN FRASCH, a citizen of the United States of America, residing at Cleveland, in the county of Cuyahoga and State of Ohio, have invented certain new and useful Improvements in Graining or Crystallizing Salt and other Materials, and Apparatus therefor, of which improvements the following specification is a full description.

This invention relates more particularly to the evaporation of solutions of salt and other crystallizable substances for the purpose of crystallizing out or graining the material in solution; and it has for its object to carry on the evaporation economically, to control the precipitation of the grains, so that they may be made more or less fine, as desired, and to enable the crystallized salt or other material to be readily drained and removed. In order to secure these results, the following dispositions are adopted:

First. A circulation of the solution is maintained in the graining apparatus, the said circulation both assisting evaporation of the liquid and the formation of small crystals and the even distribution of said crystals in the grainers, and obstructions are arranged at suitable points, so as to throw the current into eddies, which favors the precipitation of the salt. The circulation is preferably obtained by difference in specific gravity, due to heating a portion of the brine or other liquid. It is much less expensive and more convenient and satisfactory than the use of a pump or other mechanical contrivance which could be used, and the use of which is included under the first part of this invention. The heat, besides causing the circulation, raises the temperature of the liquid, and thus favors evaporation.

Second. The apparatus employed as most advantageous, and herein shown, comprises a long, shallow evaporating-trough, a comparatively deep box divided by a partition into two compartments connected with opposite ends of the trough, and communicating with each other at the bottom, and a steam-coil or system of gas-flues, or other known or suitable contrivance for heating the liquid placed in one of said compartments. The liquid in this compartment, being heated and having its specific gravity lessened, is constantly displaced by the inflow of the colder and heavier liquid in the other compartment, and there is a consequent continuous flow through the evaporating-trough. By reason of the depth of the box and the shallowness of the trough the flow of the liquid in the latter is rapid, and by placing upright boards or similar obstructions more or less closely in the trough eddies can be formed, so as to throw down crystals of almost any desired degree of fineness.

Third. To catch the crystals or grains, aprons of coarse cloth, or other open-work, perforate, or porous receivers, are placed on the bottom of the grainer. These receivers can be removed from time to time when a sufficient quantity of salt or other material has collected, and can be suspended over the grainer to allow the brine or other liquid to drain off, and can then be removed and emptied into a drier or into storage-vessels.

Fourth. To facilitate the suspension and removal of the receivers containing the grains or crystals, an elevated track or tracks are supported above the grainer, and on the same are carriages adapted to uphold and transport the receivers.

Having explained the nature and design of the several improvements constituting the present invention, a description will now be given, with the aid of the accompanying drawings, of what is deemed the best mode of carrying the same into effect.

Figure 2:
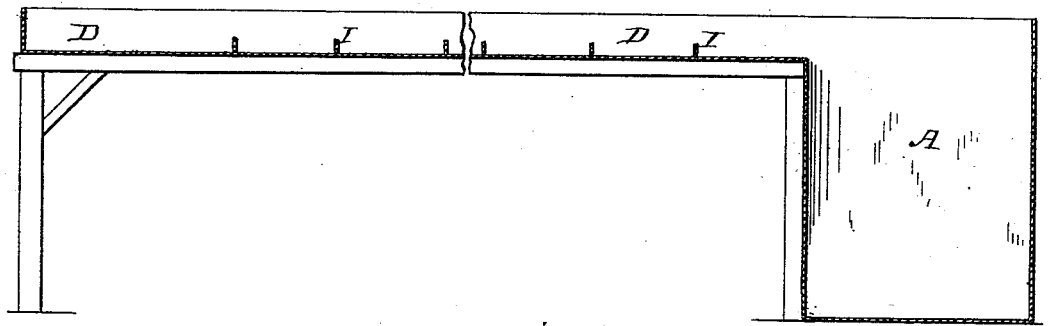
Figure 3:
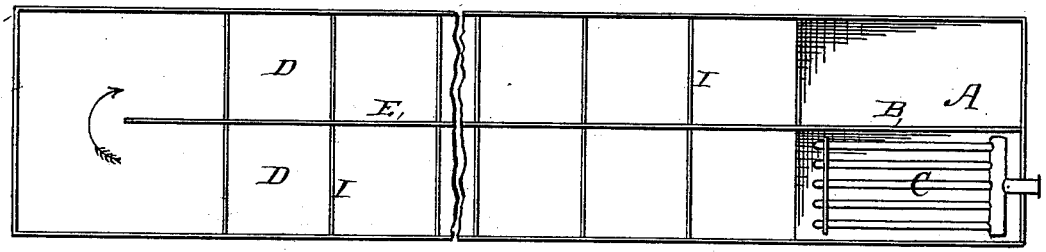
Figure 4:
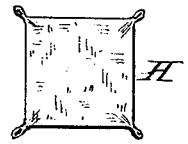

In the drawings, Figures 1 and 2 are views in vertical section and elevation, and Fig. 3 a view in plan, of apparatus constructed in accordance with the invention, the elevated track being shown only in Fig. 1; and Fig. 4 is a view of a receiving-apron.

The box A is divided by a partition, B, (which extends nearly to the bottom,) into two compartments, which communicate with each other through the space under the partition. In one of the compartments is the heater C, formed, as shown, of a system of pipes or flues, through which live steam, exhaust-steam, the products of combustion, or other hot fluid (gas or liquid) is passed by pressure from the boiler, by a natural draft, by compressors, or otherwise. D is a shallow evaporating-trough, divided by a partition, E, that extends nearly to the outer end, and communicating at opposite ends with the two compartments of the box A. Above the trough are the elevated tracks or rails F, (one on each side of the partition E.) These tracks or rails are extended to any desired distance. On them run the supporting and transporting carriages G, which are provided with hooks for supporting the salt-receivers or receiving-aprons H. These aprons or salt-receivers are placed in the trough D, so as to cover the bottom thereof. As shown, they are formed of coarse cloth, bound with rope, and provided at the corner with loops for lifting and supporting purposes. At suitable distances in the trough D are placed boards or obstructing devices I, held in place by cleats or in other suitable way. Preferably the means employed is such as to enable said boards or obstructing devices to be removed and replaced as circumstances may require.

The operation is as follows: The brine, with or without previous purification, but preferably after precipitation of the iron by lime, is run into the apparatus until the box A and trough D are filled to within a short distance of the top. The steam or other hot fluid, being caused to circulate through the heater C, raises the temperature of the surrounding brine and creates a circulation in the direction of the arrows. Evaporation takes place from the surface of the liquid as it flows through the trough D. As the crystals of salt form they deposit upon the receivers H. This deposit is favored by the eddies formed by the obstructions I. The faster the flow of the brine the more quickly will the crystals deposit, and the smaller they consequently will be. In like manner the more numerous the obstructing boards or devices I, and the consequent eddies, the finer will be the crystals. As soon as a sufficient quantity of salt has deposited on one of the receivers or receiving-aprons, the latter, with its contents, is hoisted out and suspended from the hooks of a carriage, G, and after draining a sufficient time is run off and dumped.

The apron may be hoisted by means of a pulley temporarily attached to the rail F, and may be suspended from the hooks of carriage G by small chains inserted through the loops at the corners. Immediately after the removal of an apron or receiver a fresh one is put in its place, so that all the salt will deposit on the receivers or receiving-aprons, instead of on the bottom of the grainer. If any salt should deposit in the bottom of the box A, it may be removed as occasion may require; but practically no difficulty is experienced on this account, as the salt precipitates almost exclusively in the trough. After the brine has become concentrated nearly to the point where the earthy chlorides would deposit, it is run off in whole or in part and fresh brine is supplied. The bittern may be run to waste, or it may be utilized in any known or suitable way. In case the brine has been purified of the earthy chlorides before admission to the grainer it will only be necessary to admit fresh brine from time to time.

It is obvious that modifications may be made in the details without departing from the spirit of the invention, and that portions of the invention may be used without the others. For example, in place of the system of pipes or flues shown, other known or suitable heater might be used; or the box could be made of metal and heated on one side by direct fire heat. In the place of boards other obstructions to the current could be placed in the trough. In the place of the aprons other receivers—such as trays or boxes with perforated bottoms—could be used, and the carriages could be adapted to support and transport them. The obstructing devices and the salt-receivers might be omitted, and the salt removed in the ordinary way; or the said receivers and transporting means could be used with old grainers. Instead of a partitioned box, a box or vessel with one compartment could be used, the trough communicating therewith at the bottom; but no claim is made herein to an evaporating-trough having its two ends connected by pipes through a boiler, unless used in combination with the obstructions or salt-receivers, or both.

It is evident that the methods and apparatus could be used on other material than salt, and for concentrating liquids as well as for crystallizing out materials in solution.

I claim the new improvements herein described, all and several, to wit:

1. The method of inducing the precipitation of fine crystals by creating a continuous circulation of the solution during evaporation of the solvent and producing eddies in the current, substantially as described.

2. The improvement in recovering salt and other materials from grainers or evaporators, consisting in collecting the salt or other material by aprons or other removable receivers, whereon the crystals are allowed to precipitate, as set forth.

3. The improvement in recovering salt and other materials from grainers or evaporators, consisting in allowing the salt or other material to precipitate upon cloth aprons or other open-work, perforated, or porous receivers in the grainer or evaporator, renewing said receivers, and allowing the material to drain, and then transporting the same to storage-vessels or other receptacles, as set forth.

4. The combination, with a grainer or graining apparatus, of the means for producing a circulation therein, and the obstructing device for throwing the current into eddies, as set forth.

5. The combination of the box, the evaporating-trough, and the heater for heating the liquid in said box, substantially as described.

6. The combination of the partitioned box, the trough, and the heater comprising a system of pipes or flues in one compartment of said box, substantially as described.

7. The combination of the deep box, the shallow trough, the heater, and the obstructing devices in said trough, substantially as described.

8. The combination, with a grainer or graining apparatus, of removable receivers for collecting the crystals as they precipitate, substantially as described.

9. The combination, with a grainer or evaporator, of the removable receiver, the elevated track or rail, and one or more carriages for supporting the receivers traveling on said track or rail, substantially as described.

10. A graining apparatus comprising in combination the partitioned box, the trough, the heater, the removable receivers, the elevated track or rail, and one or more supporting and traveling carriages, substantially as described.

In testimony whereof I affix my signature in presence of two witnesses.

HERMAN FRASCH.

Witnesses:
J. D. KETCHUM,
E. A. COOLEY.